(12) United States Patent
Kwok

(10) Patent No.: US 9,425,850 B2
(45) Date of Patent: Aug. 23, 2016

(54) SIMULTANEOUS VOICE AND DATA COMMUNICATION

(76) Inventor: Sai C. Kwok, San Diego, CA (US)

( * ) Notice: Subject to any disclaimer, the term of this patent is extended or adjusted under 35 U.S.C. 154(b) by 198 days.

(21) Appl. No.: 13/282,221

(22) Filed: Oct. 26, 2011

(65) Prior Publication Data

US 2012/0275350 A1 Nov. 1, 2012

Related U.S. Application Data

(60) Provisional application No. 61/407,266, filed on Oct. 27, 2010.

(51) Int. Cl.
*H04B 7/00* (2006.01)
*H04B 1/403* (2015.01)
*H04B 1/525* (2015.01)

(52) U.S. Cl.
CPC ............... *H04B 1/406* (2013.01); *H04B 1/525* (2013.01)

(58) Field of Classification Search
CPC ... H04W 88/06; H04B 1/0057; H04B 7/0871; H04B 7/0689; H04B 1/406; H04B 1/525; H04B 88/02
USPC ........... 370/277, 278, 328; 333/132; 455/296, 455/317, 78, 450; 133/277, 278, 328
See application file for complete search history.

(56) References Cited

U.S. PATENT DOCUMENTS

| | | |
|---|---|---|
| 5,881,369 A | 3/1999 | Dean et al. |
| 6,144,260 A | 11/2000 | Hashimoto et al. |
| 6,380,823 B1 | 4/2002 | Ikata et al. |
| 6,529,715 B1 | 3/2003 | Kitko et al. |
| 6,795,690 B2 | 9/2004 | Weissman et al. |
| 7,250,830 B2 * | 7/2007 | Layne et al. ................... 333/132 |
| 7,383,024 B2 | 6/2008 | Mueller et al. |
| 7,505,790 B2 | 3/2009 | Chang et al. |
| 7,643,848 B2 | 1/2010 | Robinett et al. |

(Continued)

FOREIGN PATENT DOCUMENTS

| | | |
|---|---|---|
| CN | 1240550 A | 1/2000 |
| CN | 101416416 A | 4/2009 |

(Continued)

OTHER PUBLICATIONS

3GPP TR 37.801 v0.10.0 (Jan. 2011), 3rd Generation Partnership Project; Technical Specification Group Radio Access Networks; UMTS-LTE 3500 MHz Work Item Technical Report (Release 10).

(Continued)

*Primary Examiner* — Robert M Morlan
*Assistant Examiner* — Lionel Preval
(74) *Attorney, Agent, or Firm* — S. Hossain Beladi

(57) ABSTRACT

A wireless device configured for simultaneous voice and data communications is described. The wireless device includes a voice and data transceiver. The voice and data transceiver includes data path circuitry, voice path circuitry, a first multiplexer and a second multiplexer. The first multiplexer sends a primary data receive signal to the data path circuitry and receives a data transmit signal from the data path circuitry. The second multiplexer sends a diversity data receive signal to the data path circuitry, sends a voice receive signal to the voice path circuitry and receives a voice transmit signal from the voice path circuitry. The wireless device also includes a first antenna coupled to the first multiplexer. The wireless device further includes a second antenna coupled to the second multiplexer.

33 Claims, 9 Drawing Sheets

(56) References Cited

U.S. PATENT DOCUMENTS

| | | | |
|---|---|---|---|
| 7,656,251 | B1 | 2/2010 | Bauder et al. |
| 7,796,950 | B2 | 9/2010 | Cheng et al. |
| 7,801,556 | B2 | 9/2010 | Tran |
| 8,170,487 | B2 | 5/2012 | Sahota et al. |
| 8,244,194 | B2 | 8/2012 | Morgan et al. |
| 8,320,301 | B2 * | 11/2012 | Walton et al. ............... 370/328 |
| 2001/0044292 | A1 | 11/2001 | Jeon et al. |
| 2003/0171107 | A1 * | 9/2003 | Sorrells et al. ............... 455/296 |
| 2003/0193923 | A1 | 10/2003 | Abdelgany et al. |
| 2004/0063437 | A1 * | 4/2004 | Braun et al. ............... 455/450 |
| 2005/0104685 | A1 | 5/2005 | Kuroki et al. |
| 2005/0227631 | A1 | 10/2005 | Robinett et al. |
| 2007/0021080 | A1 | 1/2007 | Kuriyama et al. |
| 2007/0161358 | A1 | 7/2007 | Bogdan |
| 2008/0119158 | A1 * | 5/2008 | Filipovic et al. ............. 455/317 |
| 2009/0176470 | A1 | 7/2009 | Karakis |
| 2009/0253385 | A1 | 10/2009 | Dent et al. |
| 2009/0279490 | A1 | 11/2009 | Alcorn |
| 2010/0105340 | A1 | 4/2010 | Weissman |
| 2010/0135428 | A1 | 6/2010 | Yuda et al. |
| 2010/0231472 | A1 | 9/2010 | Tran |
| 2010/0261504 | A1 | 10/2010 | Lukkarila |
| 2010/0279709 | A1 | 11/2010 | Shahidi et al. |
| 2011/0013543 | A1 | 1/2011 | Lim et al. |
| 2011/0013677 | A1 | 1/2011 | Ibrahim et al. |
| 2011/0045786 | A1 * | 2/2011 | Leinonen et al. ............... 455/78 |
| 2011/0159905 | A1 | 6/2011 | Zheng |
| 2011/0222443 | A1 | 9/2011 | Khlat |
| 2011/0292844 | A1 * | 12/2011 | Kwun et al. ............... 370/278 |
| 2012/0044919 | A1 | 2/2012 | Medapalli et al. |
| 2012/0044976 | A1 | 2/2012 | Lai et al. |
| 2012/0127897 | A1 | 5/2012 | Xu et al. |
| 2012/0127898 | A1 | 5/2012 | Lim et al. |
| 2012/0190355 | A1 | 7/2012 | Van Rooyen |
| 2012/0236976 | A1 | 9/2012 | Smith |
| 2012/0243447 | A1 | 9/2012 | Weissman et al. |
| 2013/0176913 | A1 | 7/2013 | Niskanen et al. |
| 2013/0322309 | A1 | 12/2013 | Smith |
| 2014/0003300 | A1 | 1/2014 | Weissman et al. |

FOREIGN PATENT DOCUMENTS

| | | |
|---|---|---|
| CN | 101502008 A | 8/2009 |
| EP | 1450502 A2 | 8/2004 |
| EP | 1755230 A2 | 2/2007 |
| EP | 2393205 A2 | 12/2011 |
| JP | H10229359 A | 8/1998 |
| JP | 2001196967 A | 7/2001 |
| JP | 2004023536 A | 1/2004 |
| JP | 2005102098 A | 4/2005 |
| JP | 2005167910 A | 6/2005 |
| JP | 2010056876 A | 3/2010 |
| WO | WO-03061148 A1 | 7/2003 |
| WO | WO-2007092767 A1 | 8/2007 |
| WO | WO2009039435 A1 | 3/2009 |
| WO | WO 2009066199 A2 * | 5/2009 |
| WO | WO-2012008705 A2 | 1/2012 |

OTHER PUBLICATIONS

3GPP TS 36.101 v10.1.1 (Jan. 2011), 3rd Generation Partnership Project; Technical Specification Group Radio Access Network; Evolved Universal Terrestrial Radio Access (E-UTRA); User Equipment (UE) radio transmission and reception (Release 10).

Zargari M., et al., "A Single-Chip Dual-Band Tri-Mode CMOS Transceiver for IEEE 802.11a/b/g Wireless LAN," IEEE Journal of Solid-State Circuits, vol. 39 (12), Dec. 2004, pp. 2239-2249.

International Search Report and Written Opinion—PCT/US2011/058150—ISA/EPO—Mar. 6, 2012.

Walsh, Kevin, "RF Switches Guide Signals in Smart Phones," Microwaves & RF, http://www.skyworksinc.com/downloads/press_room/published_articles/Microwave_RF_092010.pdf, Sep. 2010.

* cited by examiner

SIMULTANEOUS VOICE AND DATA COMMUNICATION

RELATED APPLICATIONS

This application is related to and claims priority from U.S. Provisional Patent Application Ser. No. 61/407,266 filed Oct. 27, 2010, for "SYSTEM AND METHODS TO IMPLEMENT SIMULTANEOUS VOICE AND DATA."

TECHNICAL FIELD

The present disclosure relates generally to electronic devices for communication systems. More specifically, the present disclosure relates to systems and methods for simultaneous voice and data communication.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

These electronic devices may communicate wireless with each other and with a network. Electronic devices may provide many different types of communication. For example, some electronic devices provide voice communication while other electronic devices provide data communication. Some electronic devices now provide both voice communication and data communication. Benefits may be realized by providing improved systems and methods to implement simultaneous voice and data communications for electronic devices.

SUMMARY

A wireless device configured for simultaneous voice and data communications is described. The wireless device includes a voice and data transceiver. The voice and data transceiver includes data path circuitry, voice path circuitry, a first diplexer and a second diplexer. The first diplexer sends a primary data receive signal to the data path circuitry and receives a data transmit signal from the data path circuitry. The second diplexer sends a diversity data receive signal to the data path circuitry, sends a voice receive signal to the voice path circuitry and receives a voice transmit signal from the voice path circuitry. The wireless device also includes a first antenna coupled to the first diplexer and a second antenna coupled to the second diplexer.

The first diplexer and the second diplexer may reduce third order intermodulation interference introduced in the voice and data transceiver. The wireless device may be a wireless communication device configured to operate using a Long Term Evolution standard. The data path circuitry may include a primary data receive chain, a data transmit chain and a diversity data receive chain. The voice path circuitry may include a voice receive chain and a voice transmit chain.

A wireless device configured for simultaneous voice and data communications is also described. The wireless device includes a voice and data transceiver. The voice and data transceiver includes data path circuitry, voice path circuitry, a first diplexer and a second diplexer. The first diplexer sends a primary data receive signal to the data path circuitry, receives a data transmit signal from the data path circuitry and sends a voice receive signal to the voice path circuitry. The second diplexer sends a diversity data receive signal to the data path circuitry and receives a voice transmit signal from the voice path circuitry. The wireless device also includes a first antenna coupled to the first diplexer and a second antenna coupled to the second diplexer.

A wireless device configured for simultaneous voice and data communications is described. The wireless device includes a voice and data transceiver. The voice and data transceiver includes data path circuitry, voice path circuitry, a first diplexer and a second diplexer. The first diplexer sends a diversity data receive signal to the data path circuitry, receives a data transmit signal from the data path circuitry and sends a voice receive signal to the voice path circuitry. The second diplexer sends a primary data receive signal to the data path circuitry and receives a voice transmit signal from the voice path circuitry. The wireless device also includes a first antenna coupled to the first diplexer and a second antenna coupled to the second diplexer.

A method for simultaneous voice and data communication is described. A voice signal is communicated. A data signal is also communicated. Third order intermodulation interference generated by simultaneously communicating the voice signal and the data signal is minimized The voice signal may be communicated using a first antenna and a first diplexer. The data signal may be communicated using the first antenna, the first diplexer, a second antenna and a second diplexer. Communicating the voice signal may include transmitting the voice signal. Communicating the data signal may include transmitting the data signal. The voice signal and the data signal may be transmitted simultaneously.

Communicating the voice signal may include receiving the voice signal. Communicating the data signal may include receiving the data signal. The voice signal and the data signal may be received simultaneously. The method may be performed by a wireless communication device.

A wireless device configured for simultaneous voice and data communications is also described. The wireless device includes a voice and data transceiver. The voice and data transceiver includes data path circuitry, voice path circuitry, a first diplexer and a second diplexer. The first diplexer sends a primary data receive signal to the data path circuitry, receives a voice transmit signal from the voice path circuitry and receives a data transmit signal from the data path circuitry. The second diplexer sends a diversity data receive signal to the data path circuitry and sends a voice receive signal to the voice path circuitry. The voice and data transceiver also includes a duplexer that is coupled between the second diplexer and a data modem. The voice and data transceiver further includes a resistor that is coupled between the duplexer and ground. The wireless device also includes a first antenna coupled to the first diplexer and a second antenna coupled to the second diplexer.

The configuration of the duplexer and the resistor may be such that the duplexer is used as a diversity receive signal filter. The data transmit signal may be terminated at the resistor such that it does not reflect back to the duplexer to generate third order intermodulation interference with the voice transmit signal. The resistor may be a 50 ohm resistor.

An apparatus for simultaneous voice and data communication is also described. The apparatus includes means for communicating a voice signal. The apparatus also includes means for communicating a data signal. The apparatus further includes means for minimizing third order intermodulation interference generated by simultaneously communicating the voice signal and the data signal.

The means for communicating the voice signal may include using a first antenna and a first diplexer. The means for communicating the data signal may include the first antenna, the first diplexer, a second antenna and a second diplexer. Communicating the voice signal may include transmitting the voice signal. Communicating the data signal may include transmitting the data signal. The voice signal and the data signal may be transmitted simultaneously.

Communicating the voice signal may include receiving the voice signal. Communicating the data signal may include receiving the data signal. The voice signal and the data signal may be received simultaneously. The apparatus may be a wireless communication device.

DETAILED DESCRIPTION

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP LTE, a mobile station or device may be referred to as a "user equipment" (UE).

3GPP specifications are based on evolved Global System for Mobile Communications (GSM) specifications, which are generally known as the Universal Mobile Telecommunications System (UMTS). 3GPP standards are structured as releases. Discussion of 3GPP thus frequently refers to the functionality in one release or another. For example, Release 99 specifies the first UMTS third generation (3G) networks, incorporating a CDMA air interface. Release 6 integrates operation with wireless local area networks (LAN) networks and adds High Speed Uplink Packet Access (HSUPA). Release 8 introduces dual downlink carriers and Release 9 extends dual carrier operation to uplink for UMTS.

CDMA2000 is a family of third generation (3G) technology standards that use code division multiple access (CDMA) to send voice, data and signaling between wireless devices. CDMA2000 may include CDMA2000 1X, CDMA2000 EV-DO Rev. 0, CDMA2000 EV-DO Rev. A and CDMA2000 EV-DO Rev. B. 1x or 1xRTT refers to the core CDMA2000 wireless air interface standard. 1x more specifically refers to 1 times Radio Transmission Technology and indicates the same radio frequency (RF) bandwidth as used in IS-95. 1xRTT adds 64 additional traffic channels to the forward link. EV-DO refers to Evolution-Data Optimized. EV-DO is a telecommunications standard for the wireless transmission of data through radio signals.

Figure 1:
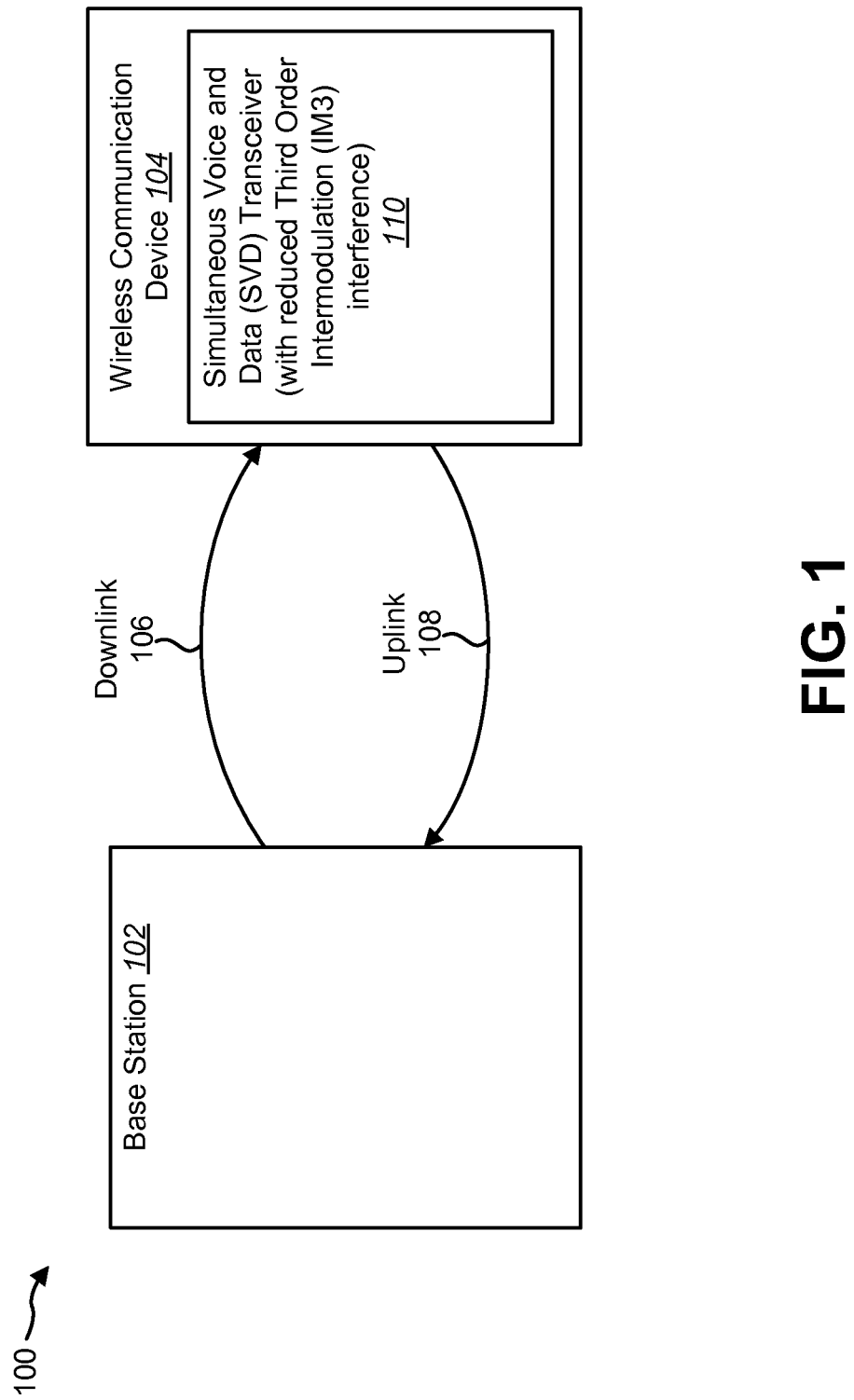
FIG. 1 shows a wireless communication system 100 with multiple wireless devices.

FIG. 1 shows a wireless communication system 100 with multiple wireless devices. A wireless device may be a base station 102, a wireless communication device 104, a controller, or the like. A base station 102 is a station that communicates with one or more wireless communication devices 104. A base station 102 may also be referred to as, and may include some or all of the functionality of, an access point, a broadcast transmitter, a Node B, an evolved Node B, etc. Each base station 102 provides communication coverage for a particular geographic area. A base station 102 may provide communication coverage for one or more wireless communication devices 104. The term "cell" can refer to a base station 102 and/or its coverage area depending on the context in which the term is used. Each cell may be further divided into sectors. A base station 102 may thus cover multiple sectors.

A wireless communication device 104 may also be referred to as, and may include some or all of the functionality of, a terminal, an access terminal, a user equipment (UE), a subscriber unit, a station, etc. A wireless communication device 104 may be a cellular phone, a personal digital assistant (PDA), a wireless device, a wireless modem, a handheld device, a laptop computer, a PC card, compact flash, an external or internal modem, a wireline phone, etc. A wireless communication device 104 may be mobile or stationary. A wireless communication device 104 may communicate with zero, one or multiple base stations 102 on a downlink 106 and/or an uplink 108 at any given moment. The downlink 106 (or forward link) refers to the communication link from a base station 102 to a wireless communication device 104, and the uplink 108 (or reverse link) refers to the communication link from a wireless communication device 104 to a base station 102. Uplink 108 and downlink 106 may refer to the communication link or to the carriers used for the communication link.

The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems and spatial division multiple access (SDMA) systems.

A wireless communication network 100 may provide communication for a number of wireless communication devices 104, each of which may be serviced by a base station 102. Wireless communication networks 100 that use CDMA2000 for voice and Data Optimized (DO) for data may be unable to provide simultaneous voice and data (SVD) to consumers. For example, a base station 102 may be unable to provide both data and voice services simultaneously to a wireless communication device 104. One main reason for this inability is the large amounts of interference that may occur during simultaneous voice and data (SVD) transmission.

In order to obtain simultaneous voice and data (SVD) services, a wireless communication device 104 may need a simultaneous voice and data (SVD) transceiver 110. In order to properly transmit and receive simultaneous voice and data (SVD), the design of the simultaneous voice and data (SVD) transceiver 110 may be such that third order intermodulation (IM3) interference reduction is needed. The simultaneous voice and data (SVD) transceiver 110 may be designed to minimize the third order intermodulation (IM3) interference generated without increasing the number of antennas on the wireless communication device 104. In LTE, a wireless communication device 104 may have two antennas; thus, it may be desirable to provide simultaneous voice and data (SVD) for LTE with two antennas. Examples of simultaneous voice and data (SVD) systems include 1xCDMA voice +LTE/DO/ TDSCDMA data, GSM voice +LTE/WCDMA/TDSCDMA data and UMTS voice +LTE/TDSCDMA data.

Typically, the data transmit signal (Tx1), the primary data receive signal(PRx), the voice transmit signal (Tx2) and the voice receive signal(Rx) use a first antenna while the diversity data receive signal (DRx) uses a second antenna. In this system, the third order intermodulation (IM3) interference for data $I_{IM3(data)}$ is illustrated in Equation (1):

$$I_{IM3(data)} \propto (Tx1)^2 * Tx2. \tag{1}$$

The third order intermodulation (IM3) interference for voice $I_{IM3(voice)}$ is illustrated in Equation (2):

$$I_{IM3(voice)} \propto Tx1 * (Tx2)^2. \tag{2}$$

The use of one antenna to transmit both data and voice may result in challenges to meet the Federal Communication Commission (FCC) Specific Absorption Rate (SAR) requirements. In addition, the third-order intermodulation (IM3) interference level is the strongest with both data and voice transmitted signals are at or near their maximum. By using a simultaneous voice and data (SVD) transceiver 110 (with reduced third order intermodulation (IM3) interference), the third order intermodulation (IM3) interference for data $I_{IM3(data)}$ and the third order intermodulation (IM3) interference for voice $I_{IM3(voice)}$ may be reduced.

Figure 2:
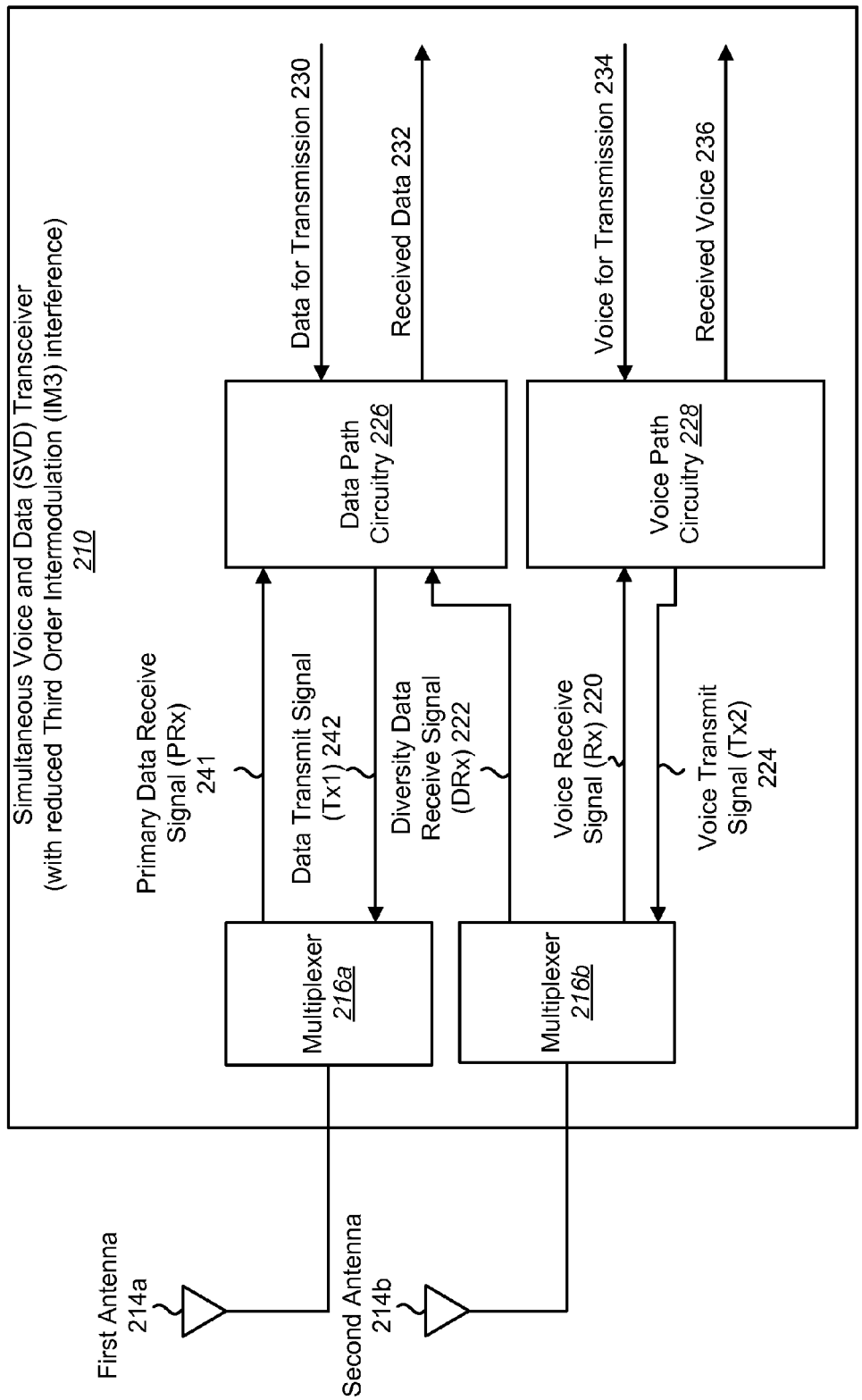
FIG. 2 is a block diagram illustrating a simultaneous voice and data (SVD) transceiver for use in the present systems and methods.

FIG. 2 is a block diagram illustrating a simultaneous voice and data (SVD) transceiver 210 for use in the present systems and methods. The simultaneous voice and data (SVD) transceiver 210 of FIG. 2 may be one configuration of the simultaneous voice and data (SVD) transceiver 110 of FIG. 1. The simultaneous voice and data (SVD) transceiver 210 may be designed such that there is reduced third order intermodulation (IM3) interference. The simultaneous voice and data (SVD) transceiver 210 may be located on a wireless communication device 104 with a first antenna 214a and a second antenna 214b. The simultaneous voice and data (SVD) transceiver 210 may be coupled to both the first antenna 214a and the second antenna 214b.

The simultaneous voice and data (SVD) transceiver 210 may include data path circuitry 226 and voice path circuitry 228. Both data signals and voice signals may be input and output from the data path circuitry 226. Also, both data and voice signals may be input and output from the voice path circuitry 228. The data path circuitry 226 may be coupled to a first multiplexer 216a. A multiplexer 216 may be a passive device that implements frequency domain multiplexing. In one configuration, the multiplexers 216 used herein may be diplexers. The first multiplexer 216a may be coupled to the first antenna 214a. Signals between the data path circuitry 226 and the first multiplexer 216a may include a primary data receive signal (PRx) 241 and a data transmit signal (Tx1) 242. In wireless communication devices 104 that make use of antenna diversity, one or more additional antennas 214 may be used to improve the quality and reliability of a wireless link. For example, the wireless communication device 104 may receive a data signal over each antenna 214. One of these data signals may be a primary data signal while the other is a diversity data signal. In one configuration, the primary data receive signal (PRx) 241 may be the data signal that has the highest signal-to-noise ratio (SNR) (compared to the diversity data receive signal (DRx) 222). In another configuration, the primary data receive signal (PRx) 241 may be the data signal that is received by the primary antenna 214 (i.e., the first antenna 214a) and the diversity data receive signal (DRx) 222 may be the data signal received by a secondary antenna 214 (i.e., the second antenna 214b). The data path circuitry 226 may also be coupled to a second multiplexer 216b. The second multiplexer 216b may be coupled to the second antenna 214b. Signals between the data path circuitry 226 and the second multiplexer 216b may include a diversity data receive signal (DRx) 222.

The voice path circuitry 228 may be coupled to the second multiplexer 216b. Signals between the voice path circuitry 228 and the second multiplexer 216b may include a voice receive signal (Rx) 220 and a voice transmit signal (Tx2) 224.

If the first antenna 214a is assigned the primary data receive signal (PRx) 241 and the data transmit signal (Tx1) 242 and the second antenna 214b is assigned the diversity data receive signal (DRx) 222, the voice receive signal (Rx) 220 and the voice transmit signal (Tx2) 224, the third order intermodulation (IM3) interference for data $I_{IM3(data)}$ is illustrated in Equation (3):

$$I_{IM3(data)} \propto (Tx1)^2 * (\alpha * Tx2). \tag{3}$$

The third order intermodulation (IM3) interference for voice $I_{IM3(voice)}$ may be illustrated using Equation (4):

$$I_{IM3(voice)} \propto (\alpha * Tx1) * (Tx2)^2. \tag{4}$$

In Equation (3) and Equation (4), α is the antenna-to-antenna isolation. Equation (3) and Equation (4) represent a reduction in the baseline third order intermodulation (IM3) interference (i.e., the third order intermodulation (IM3) interference from Equation (1) and Equation (2) above) of a , which is around −10 decibels (dB) for practical designs.

The data path circuitry 226 may receive data for transmission 230. The data path circuitry 226 may forward received data 232 for use by the wireless communication device 104. Likewise, the voice path circuitry 228 may receive voice for transmission 234. The voice path circuitry 228 may forward received voice 236 for use by the wireless communication device 104.

Figure 3:
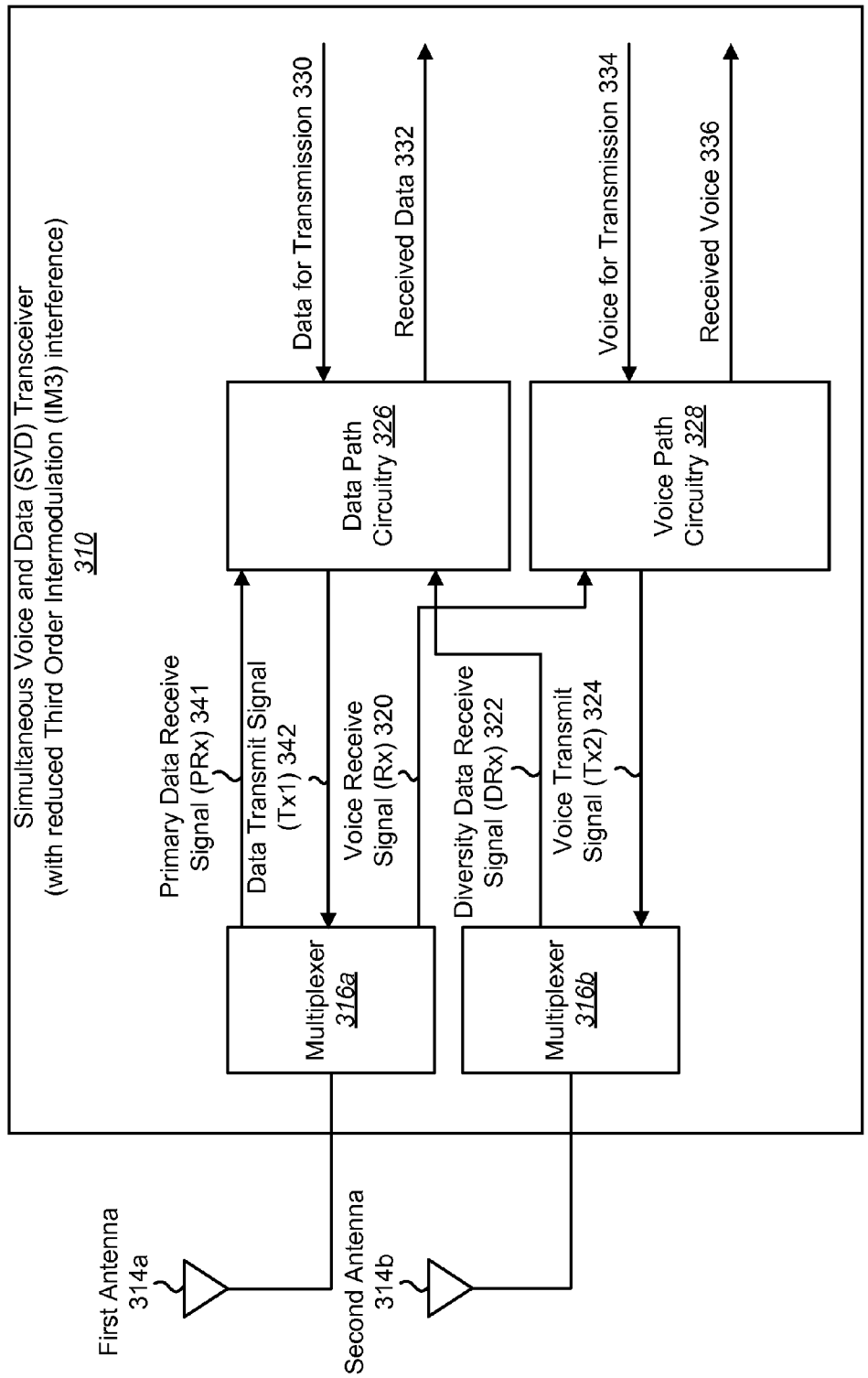
FIG. 3 is a block diagram illustrating another simultaneous voice and data (SVD) transceiver for use in the present systems and methods.

FIG. 3 is a block diagram illustrating another simultaneous voice and data (SVD) transceiver 310 for use in the present systems and methods. The simultaneous voice and data (SVD) transceiver 310 of FIG. 3 may be one configuration of the simultaneous voice and data (SVD) transceiver 110 of FIG. 1. The simultaneous voice and data (SVD) transceiver 310 may be designed such that there is further reduced third order intermodulation (IM3) interference in comparison to previous configurations. The simultaneous voice and data (SVD) transceiver 310 may be located on a wireless communication device 104 with a first antenna 314a and a second antenna 314b. The simultaneous voice and data (SVD) transceiver 310 may be coupled to both the first antenna 314a and the second antenna 314b.

The simultaneous voice and data (SVD) transceiver 310 may include data path circuitry 326 and voice path circuitry 328. Both data signals and voice signals may be input and output from the data path circuitry 326. Also, both data and voice signals may be input and output from the voice path circuitry 328. The data path circuitry 326 may be coupled to a first multiplexer 316a. The first multiplexer 316a may be coupled to the first antenna 314a. Signals between the data path circuitry 326 and the first multiplexer 316a may include a primary data receive signal (PRx) 341 and a data transmit signal (Tx1) 342. The data path circuitry 326 may also be coupled to a second multiplexer 316b. The second multiplexer 316b may be coupled to the second antenna 314b. Signals between the data path circuitry 326 and the second multiplexer 316b may include a diversity data receive signal (DRx) 322.

The voice path circuitry 328 may be coupled to both the first multiplexer 316a and the second multiplexer 316b. Signals between the voice path circuitry 328 and the first multiplexer 316a may include a voice receive signal (Rx) 320. Signals between the voice path circuitry 328 and the second multiplexer 316b may include a voice transmit signal (Tx2) 324.

If the first antenna 314a is assigned the primary data receive signal (PRx) 341, the data transmit signal (Tx1) 342 and the voice receive (Rx) signal 320 and the second antenna 314b is assigned the diversity data receive signal (DRx) 322 and the voice transmit signal (Tx2) 324, the third order intermodulation (IM3) interference for voice $I_{IM3(voice)}$ may be illustrated using Equation (5):

$$I_{IM3(voice)} \propto 2*\alpha*(\alpha*Tx1)*(Tx2)^2. \quad (5)$$

Thus, Equation (5) represents a reduction in the baseline third order intermodulation (IM3) interference (i.e., the third order intermodulation (IM3) interference from Equation (1)) of $2\alpha^2$, which is −17 dB. The third order intermodulation (IM3) interference for data for the primary data receive signal (PRx) 341 has a reduction factor of $(\alpha+\alpha^3) \approx \alpha$, which is −10 dB.

The data path circuitry 326 may receive data for transmission 330. The data path circuitry 326 may forward received data 332 for use by the wireless communication device 104. Likewise, the voice path circuitry 328 may receive voice for transmission 334. The voice path circuitry 328 may forward received voice 336 for use by the wireless communication device 104.

Figure 4:
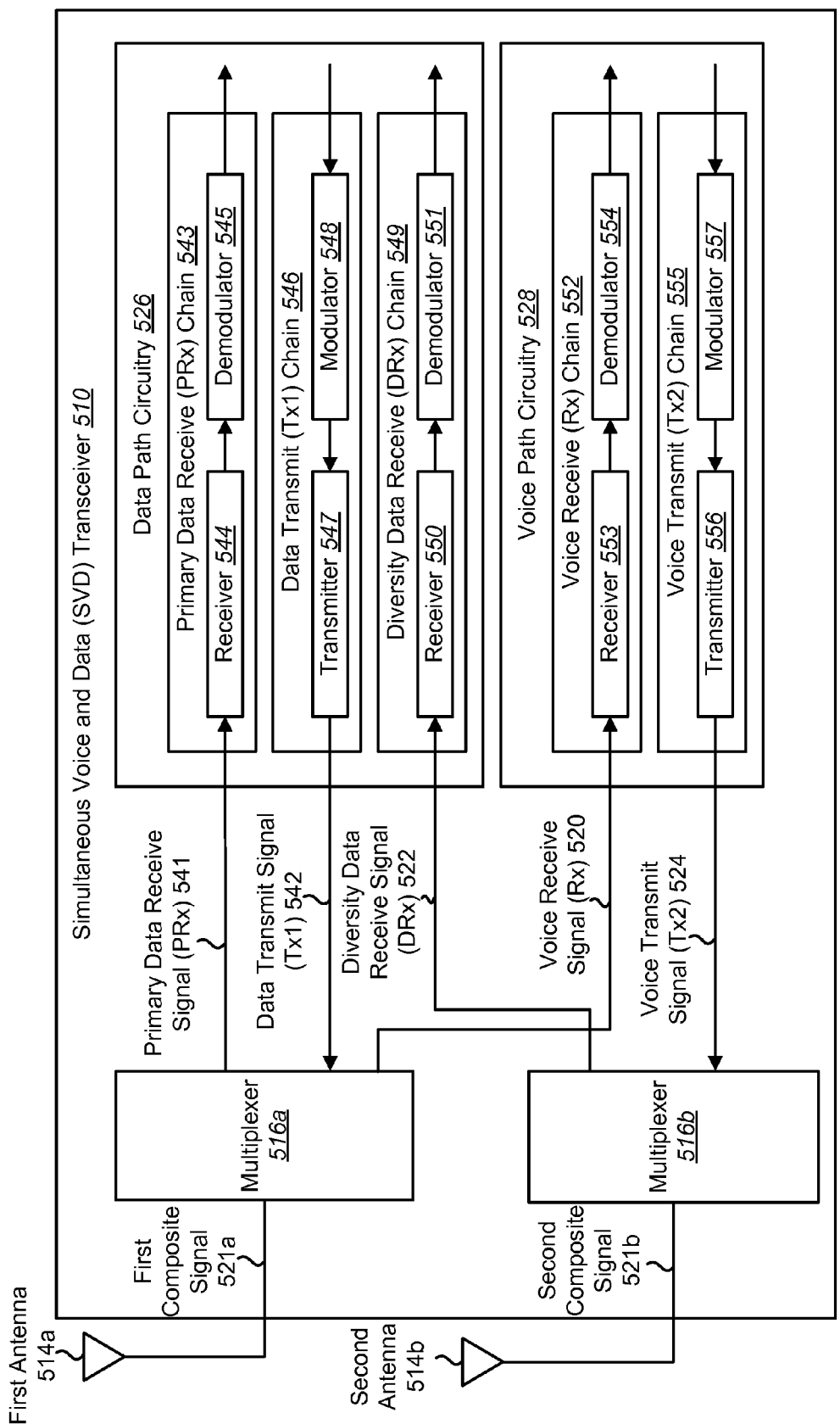
FIG. 4 is a block diagram illustrating a front-end architecture of a simultaneous voice and data (SVD) transceiver.

FIG. 4 is a block diagram illustrating a front-end architecture of a simultaneous voice and data (SVD) transceiver 510. The simultaneous voice and data (SVD) transceiver 510 of FIG. 4 may be one configuration of the simultaneous voice and data (SVD) transceiver 110 of FIG. 1. The simultaneous voice and data (SVD) transceiver 510 may be designed such that there is reduced third order intermodulation (IM3) interference. A first antenna 514a may be coupled to a first multiplexer 516a. In one configuration, the first multiplexer 516a may be a diplexer. The first antenna 514a may be used for a primary data receive (PRx) chain 543, a data transmit (Tx1) chain 546 and a voice receive (Rx) chain 552. A second antenna 514b may be coupled to a second multiplexer 516b. In one configuration, the second multiplexer 516b may be a diplexer. The second antenna 514b may be used for a diversity data receive (DRx) 549 chain and a voice transmit (Tx2) chain 555.

The primary data receive (PRx) chain 543, data transmit (Tx1) 546 chain and diversity data receive (DRx) chain 549 may each be a part of a data path circuitry 526. The primary data receive (PRx) chain 543 may include a receiver 544 and a demodulator 545. In one configuration, the demodulator 545 may be part of a modem. The data transmit (Tx1) chain 546 may include a transmitter 547 and a modulator 548. In one configuration, the modulator 548 may be part of a modem. The diversity data receive (DRx) chain 549 may include a receiver 550 and a demodulator 551. The demodulator 551 may be part of a modem.

The voice receive (Rx) chain 552 and the voice transmit (Tx2) chain 555 may be part of a voice path circuitry 528. The voice receive (Rx) chain 552 may include a receiver 553 and a demodulator 554. The demodulator 554 may be part of a modem. The voice transmit (Tx2) chain 555 may include a transmitter 556 and a modulator 557. The modulator 557 may be part of a modem.

The first multiplexer 516a may send a primary data receive signal (PRx) 541 to the primary data receive (PRx) chain 543 in the data path circuitry 526. The first multiplexer 516a may also send a voice receive signal (Rx) 520 to the voice receive (Rx) chain 552 in the voice path circuitry 528. The first multiplexer 516a may receive a data transmit signal (Tx1) 542 from the data transmit (Tx1) chain 546.

The second multiplexer 516b may send a diversity data receive signal (DRx) 522 to the diversity data receive (DRx) chain 549 in the data path circuitry 526. The second multiplexer 516b may receive a voice transmit signal (Tx2) 524 from the voice transmit (Tx2) chain 555 in the voice path circuitry 528.

A signal between the first antenna 514a and the first multiplexer 516a may be a first composite signal 521a that includes at least one of the primary data receive signal (PRx) 541, the data transmit signal (Tx1) 542 and the voice receive signal (Rx) 520. A signal between the second antenna 514b and the second multiplexer 516b may be a second composite signal 521b that includes at least one of the diversity data receive signal (DRx) 522 and the voice transmit signal (Tx2) 524.

Figure 5:
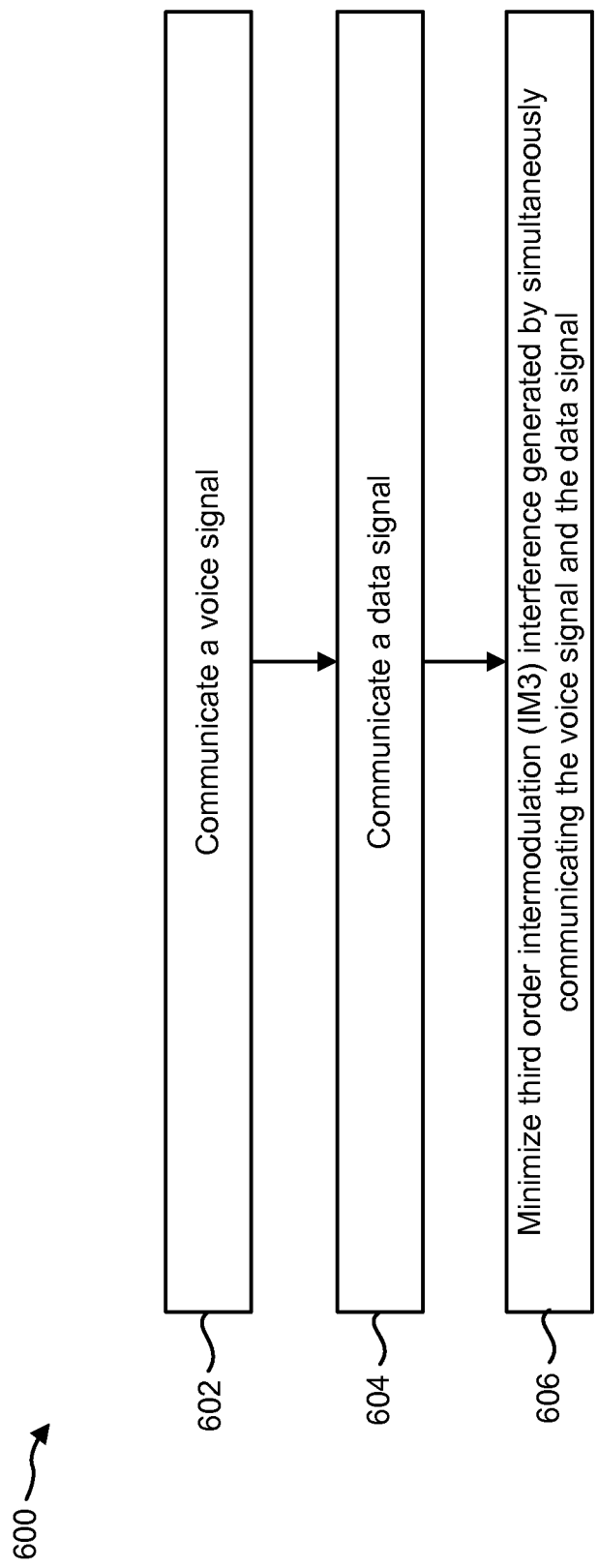
FIG. 5 is a flow diagram of a method for simultaneous voice and data communication with reduced third order intermodulation (IM3) interference.

FIG. 5 is a flow diagram of a method 600 for simultaneous voice and data communication with reduced third order intermodulation (IM3) interference. The method 600 may be performed by a wireless communication device 104. The wireless communication device 104 may communicate 602 a voice signal. In one configuration, the wireless communication device 104 may communicate 602 the voice signal using a first multiplexer 316a, a first antenna 314a coupled to the first multiplexer 316a, a second multiplexer 316b and a second antenna 314b coupled to the second multiplexer 316b. In another configuration, the wireless communication device 104 may communicate 602 the voice signal using only a multiplexer 216b and an antenna 214b coupled to the multiplexer 216b. Communicating 602 a voice signal may include both receiving a voice receive signal (Rx) 220 and transmitting a voice transmit signal (Tx2) 224. In one configuration, communicating 602 a voice signal may include receiving a voice receive signal (Rx) 220 while simultaneously transmitting a voice transmit signal (Tx2) 224.

The wireless communication device 104 may also communicate 604 a data signal. In one configuration, the wireless communication device 104 may communicate a data signal using a first multiplexer 216a, a first antenna 214a coupled to the first multiplexer 216a, a second multiplexer 216b and a second antenna 214b coupled to the second multiplexer 216b. Communicating 604 a data signal may include receiving a primary data receive signal (PRx) 241, receiving a diversity data receive signal (DRx) 222 and sending a data transmit signal (Tx1) 242. In one configuration, communicating 604 a data signal may include receiving a primary data receive signal (PRx) 241 and a diversity data receive signal (DRx) 222 while simultaneously transmitting a data transmit signal (Tx1) 242.

The wireless communication device 104 may communicate 602 the voice signal while simultaneously communicating 604 the data signal. For example, the wireless communication device 104 may receive a primary data receive signal (PRx) 241, a diversity data receive signal (DRx) 222 and a voice receive signal (Rx) 220 while simultaneously transmitting a data transmit signal (Tx1) 242 and a voice transmit signal (Tx2) 224. The wireless communication device 104 may minimize 606 third order intermodulation (IM3) interference generated by simultaneously communicating the voice signal and the data signal. In one configuration, the design of the wireless communication device 104 may minimize 606 third order intermodulation (IM3) interference.

Figure 6:
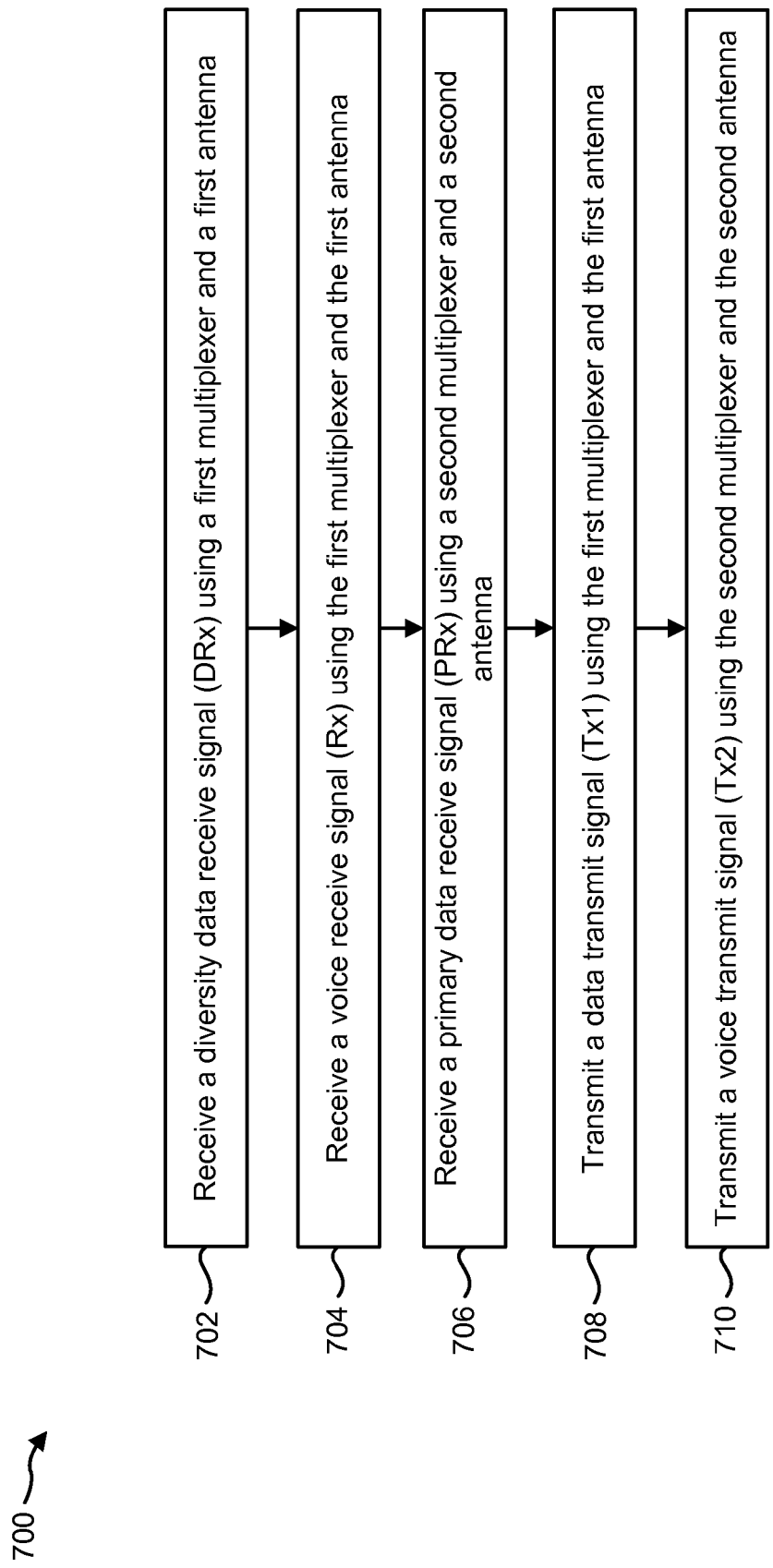
FIG. 6 is a flow diagram of a method for receiving and transmitting voice signals and data signals simultaneously.

FIG. 6 is a flow diagram of a method 700 for receiving and transmitting voice signals and data signals simultaneously. The method 700 may be performed by a wireless communication device 104. The wireless communication device 104 may include a simultaneous voice and data (SVD) transceiver 310 (with reduced third order intermodulation (IM3) interference). The wireless communication device 104 may receive 702 a diversity data receive signal (DRx) 322 using a first antenna 314*a* and a first multiplexer 316*a*. The wireless communication device 104 may also receive 704 a voice receive signal (Rx) using the first multiplexer 316*a* and the first antenna 314*a*.

The wireless communication device 104 may further receive 706 a primary data receive signal (PRx) 341 using a second multiplexer 316*b* and a second antenna 314*b*. The wireless communication device 104 may transmit 708 a data transmit signal (Tx1) 342 using the first multiplexer 316*a* and the first antenna 314*a*. The wireless communication device 104 may also transmit 710 a voice transmit signal (Tx2) 324 using the second multiplexer 316*b* and the second antenna 314*b*. The configuration of the first multiplexer 316*a* and the second multiplexer 316*b* may be such that third order intermodulation (IM3) interference introduced is reduced when compared to traditional configurations. In one configuration, the third order intermodulation (IM3) interference introduced may be reduced by −17 dB for the voice and −17 dB for the data compared to traditional configurations.

Figure 7:
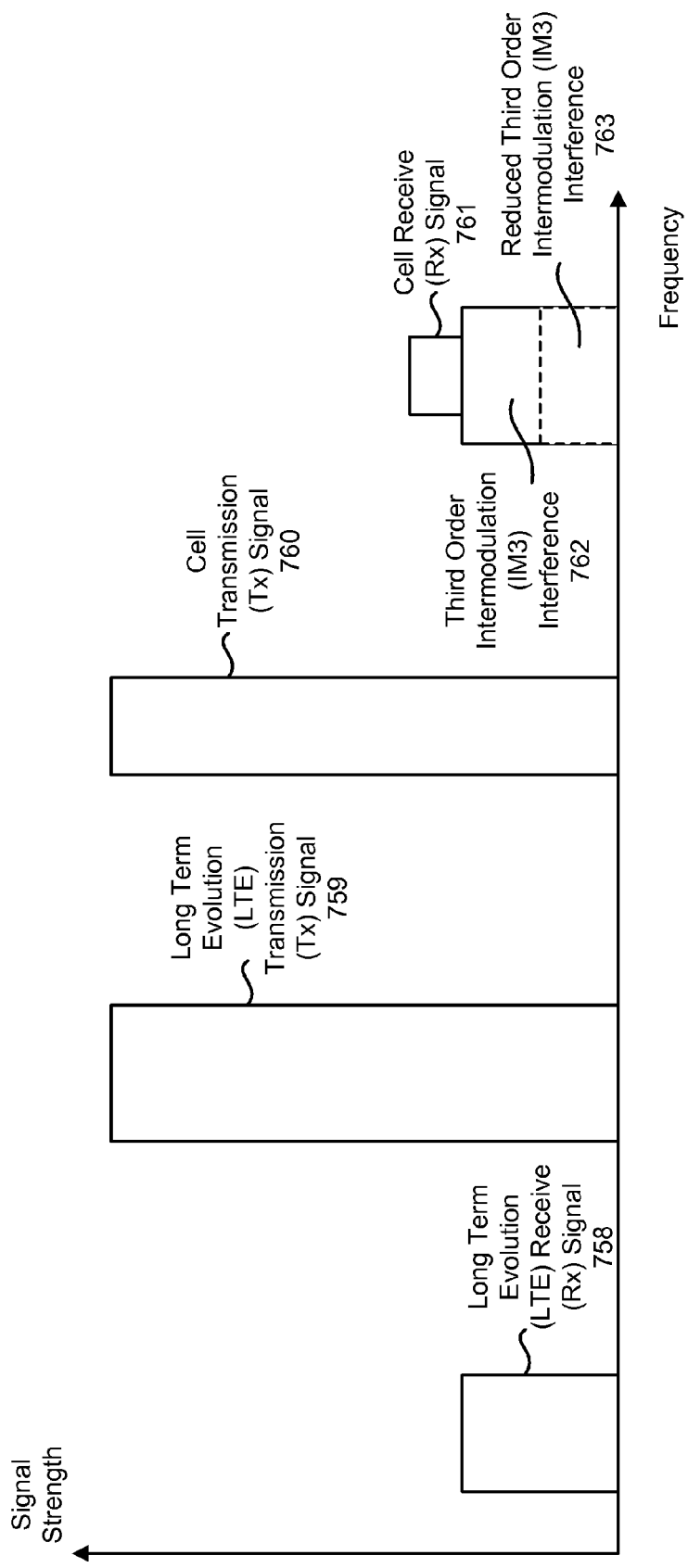
FIG. 7 illustrates the desensitization that may occur during simultaneous voice and data (SVD) communications.

FIG. 7 illustrates the desensitization that may occur during simultaneous voice and data (SVD) communications. A graph of frequency versus signal strength is shown. It is not certain when Voice over Internet Protocol (VOIP) will become ubiquitous. Thus, a dedicated chain for data (LTE, DO, WLAN, etc.) may be used along with a second chain for voice to cope with issues arising from dual transmissions. Intermodulation between the two transmission chains (the data transmission chain and the voice transmission chain) can lead to performance degradation (e.g., sensitivity, spurious emissions). This can result in challenges to meet the Federal Communication Commission (FCC) specific absorption rate (SAR) requirements.

Verizon Wireless Simultaneous Voice Long Term Evolution (SVLTE) uses the Band 13 (B13) for LTE and the Band 0 (BC0) for voice. The first 300 cellular channels are subject to desensitization because the B13 transmit signals intermodulate with the BC0 transmit signals and a third order intermodulation (IM3) product falls on the BC0 receive band. This desensitization occurs when both the Long Term Evolution (LTE) transmit signals 759 and the BC0 transmit signals (cell transmission (Tx) signal 760) are at or near maximum power, making it difficult to pass carrier certification testing.

In the past, the same antenna has been used for voice and data. The maximum transmit power for the data may be reduced at the expense of throughput. This is undesirable. Another solution was to dedicate two antennas for data and a third antenna for voice. However, the antenna-to-antenna isolation goes down as the number of antennas goes up, which is self-defeating in terms of dealing with the intermodulation (IM) problem. Furthermore, it is costly to increase the number of antennas in commercial handsets. Also, form factor limits the number of antennas that can be placed on commercial handsets.

Wideband Code Division Multiple Access (WCDMA) embeds data and voice in the same waveform to support simultaneous voice and data (SVD). There is no flexibility to utilize two physical channels for voice and data. The use of LTE offers the next highest data rate, far beyond WCDMA or data optimized (DO). VOIP will take time to mature and reach the same network coverage as existing voice networks.

The third order intermodulation (IM3) interference 762 may dominate the cell receive (Rx) signal 761 when using simultaneous voice and data communications, limiting the effectiveness of simultaneous voice and data (SVD) communications. However, by using a simultaneous voice and data (SVD) transceiver 110 (with reduced third order intermodulation (IM3) interference), only a reduced third order intermodulation (IM3) interference 763 is seen on the cell receive (Rx) signal 761, allowing for the use of simultaneous voice and data (SVD) communications. The long term evolution (LTE) receive (Rx) signal 758 may be unaffected by third order intermodulation (IM3).

The frequencies and relative signal strengths of the Long Term Evolution (LTE) receive (Rx) signal 758, the Long Term Evolution (LTE) transmission (Tx) signal 759, the cell transmission (Tx) signal 760 and the cell receive (Rx) signal 761 are shown. The frequencies and signal strengths are not drawn to scale and are illustrated only to show where the third order intermodulation (IM3) interference 762 falls on the frequency spectrum (and how this third order intermodulation (IM3) interference 762 is reduced).

Figure 8:
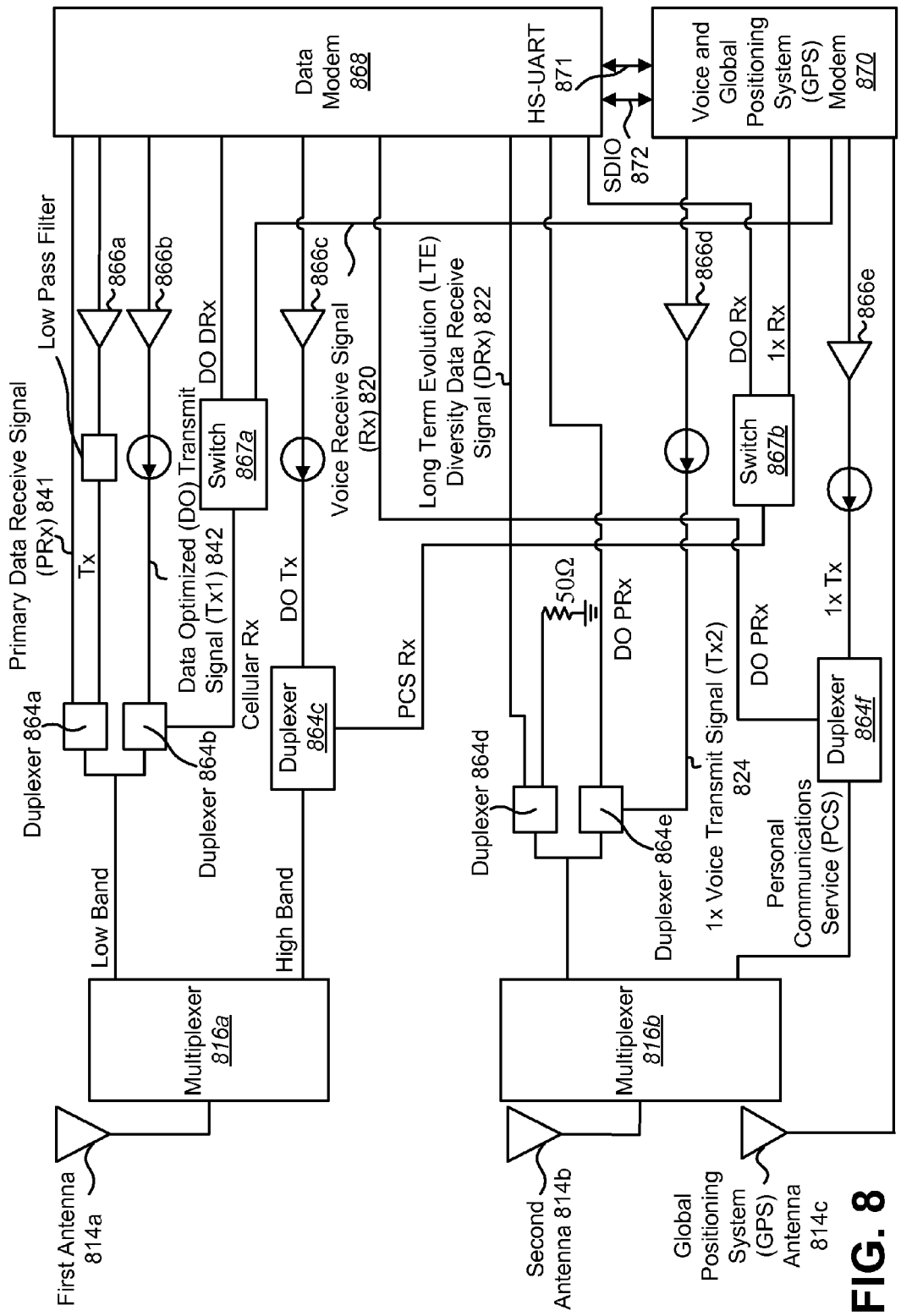
FIG. 8 illustrates the proposed radio frequency (RF) front-end architecture to mitigate the third order intermodulation (IM3) interference issue.

FIG. 8 illustrates the proposed radio frequency (RF) front-end architecture to mitigate the third order intermodulation (IM3) interference issue. A first antenna 814*a* may be used for the primary data receive (PRx) chain 543, the data transmit (Tx1) chain 546 and the voice receive (Rx) chain 552. A second antenna 814*b* may be used for the voice transmit (Tx2) chain 555 and the diversity data receive (DRx) chain 549.

A first multiplexer 816*a* may be coupled to the first antenna 814*a*. The first multiplexer 816*a* may be coupled to a first duplexer 864*a* and a second duplexer 864*b*. A duplexer 864 is a device that allows bi-directional communication over a single channel. The first duplexer 864*a* may output a primary data receive signal (PRx) 841 to a data modem 868. The second duplexer 864*b* may receive a data optimized (DO) transmit signal (Tx1) 842 from the data modem 868. The second duplexer 864*b* may also output a voice receive signal (Rx) 820 via a switch 867*a* to a voice and global positioning system (GPS) modem 870.

The first multiplexer 816*a* may also be coupled to a third duplexer 864*c*. The third duplexer 864*c* may receive a data optimized (DO) transmit signal from the data modem 868 and generate a personal communications system (PCS) receive signal (Rx). The personal communications system (PCS) receive signal (Rx) may be output to a switch 867*b* that then outputs either a data optimized (DO) receive signal to the data modem 868 or a 1x receive signal (Rx) to the voice and global positioning system (GPS) modem 870. Signals for transmission may be passed through power amplifiers 866*a-e*.

A second multiplexer 816*b* may be coupled to the second antenna 814*b*. The second multiplexer 816*b* may be coupled to a fourth duplexer 864*d* and a fifth duplexer 864*e*. The fourth duplexer 864*d* may output a long term evolution (LTE) diversity data receive signal (DRx) 822 to the data modem 868. The fifth duplexer 864e may receive a 1x voice transmit signal (Tx2) 824 from the voice and global positioning system (GPS) modem 870. The second multiplexer 816b may also be coupled to a sixth duplexer 864f for personal communications service (PCS). The voice and global positioning system (GPS) modem 870 may also be coupled to a global positioning system (GPS) antenna 814c.

The fourth duplexer 864d may be coupled to ground using a 50 Ohm resistor. The 50 Ohm resistor is used to terminate the data duplexer transmit signal (Tx1) so that the fourth duplexer 864d is used as a diversity Rx filter. This results in reduced third order intermodulation (IM3) interference generated by the fourth duplexer 864d for voice because the data Tx coupling from the first antenna 814a will contribute less to the generation of third order intermodulation (IM3) interference. This is because the data transmit signal (Tx) find a 50 Ohm termination so that it does not reflect back to the voice duplexer to generate third order intermodulation (IM3) distortion with the voice transmit signal (Tx).

If a data transmit signal (Tx1) 242 and a voice transmit (Tx) signal 224 are combined in the same antenna, then the third order intermodulation (IM3) interference $\sim Tx1^*(Tx2)^2$. If antenna-to-antenna isolation is $\alpha$, the $IM3_1$ (the third order intermodulation (IM3) interference due to the circuitry for the first antenna 814a)$\sim Tx1$ $(\alpha^*Tx2)^2$ because Tx2 is in the second antenna 814b. Similarly, $IM3_2$ (the third order intermodulation (IM3) interference due to the circuitry for the second antenna 814b)$\sim(\alpha^*Tx1)^*(Tx2)^2$ because Tx1 needs to be coupled to the second antenna 814b to generate $IM3_2$. Since the voice receive (Rx) signal 820 uses the first antenna 814a, the total third order intermodulation (IM3) interference that contributes to desensitization is $IM3_1+\alpha^*IM3_2=2^*\alpha^*(\alpha^*Tx1)^*(Tx2)^2$.

Thus, separating Tx1 and Tx2 in two antennas 814 (the voice receive signal (Rx) 820 and Tx2 are in the same antenna 814) provides an improvement factor of $\alpha$ (10 dB) over the combining of Tx1 and Tx2 in the same antenna 814. This allows for a better use of the available spectrum and increased flexibility in spectrum planning. It also allows for concurrency of voice and data that the current standard does not support (e.g., SVLTE and SVDO). More security can be imposed on a chosen channel.

By separating Tx1 and Tx2 in two antennas 814 (and placing the voice receive signal (Rx) 820 in the same antenna 814 as Tx1), an improvement of $2(\alpha)^2$ (17 dB) may be obtained. The data requires a primary data receive signal (PRx) 841 and a diversity data receive signal (DRx) 822 to benefit from spatial diversity gain. The voice transmit signal (Tx2) 824 may be allocated to the same antenna 814 as the diversity data receive signal (DRx) 822. The voice receive signal (Rx) 820 may be allocated to the same antenna 814 as the primary data receive signal (PRx) 841. This mitigates intermodulation issues between the data transmit signal (Tx1) 842 and the voice transmit signal (Tx2) 824 by taking advantages of the antenna-to-antenna isolation (>10 dB). Specific absorption rate (SAR) hot spots from the two antennas 814 are not likely to coincide, improving the dual transmit SAR performance in comparison to a single antenna 814. It also allows for design trade-off to dedicate the better performing antenna 814 to the most important voice aspect. It further eases antenna 814 design constraints by not simultaneously supporting voice and data in one antenna 814. Finally, the isolation between the voice transmit signal (Tx2) 824 and the voice receive signal (Rx) 820 due to antenna-to-antenna isolation plus duplexer isolation would lead to improved single tone desensitization performance.

The data modem 868 and the voice and global positioning system (GPS) modem 870 may use a high-speed universal asynchronous receiver/transmitter (HS-UART) 871 to communicate with each other. The data modem 868 and the voice and global positioning system (GPS) modem 870 may also use a Secure Digital Input Output (SDIO) 872 to communicate with each other.

Figure 9:
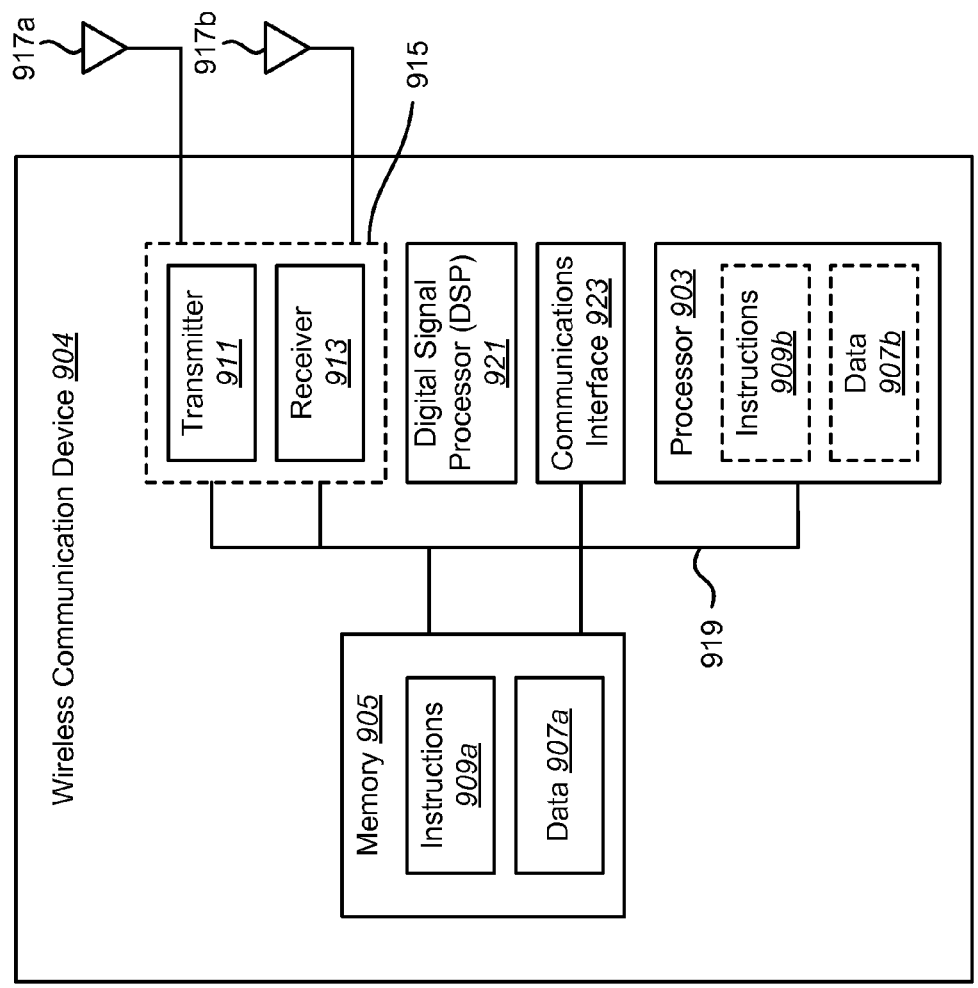
FIG. 9 illustrates certain components that may be included within a wireless communication device.

FIG. 9 illustrates certain components that may be included within a wireless communication device 904. The wireless communication device 904 may be an access terminal, a mobile station, a user equipment (UE), etc. The wireless communication device 904 includes a processor 903. The processor 903 may be a general purpose single- or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the wireless communication device 904 of FIG. 9, in an alternative configuration, a combination of processors (e.g., an ARM and DSP) could be used.

The wireless communication device 904 also includes memory 905. The memory 905 may be any electronic component capable of storing electronic information. The memory 905 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 907a and instructions 909a may be stored in the memory 905. The instructions 909a may be executable by the processor 903 to implement the methods disclosed herein. Executing the instructions 909a may involve the use of the data 907a that is stored in the memory 905. When the processor 903 executes the instructions 909, various portions of the instructions 909b may be loaded onto the processor 903, and various pieces of data 907b may be loaded onto the processor 903.

The wireless communication device 904 may also include a transmitter 911 and a receiver 913 to allow transmission and reception of signals to and from the wireless communication device 904 via a first antenna 917a and a second antenna 917b. The transmitter 911 and receiver 913 may be collectively referred to as a transceiver 915. The wireless communication device 904 may also include (not shown) multiple transmitters, additional antennas, multiple receivers and/or multiple transceivers.

The wireless communication device 904 may include a digital signal processor (DSP) 921. The wireless communication device 904 may also include a communications interface 923. The communications interface 923 may allow a user to interact with the wireless communication device 904.

The various components of the wireless communication device 904 may be coupled together by one or more buses, which may include a power bus, a control signal bus, a status signal bus, a data bus, etc. For the sake of clarity, the various buses are illustrated in FIG. 9 as a bus system 919.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" or "computer-program product" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 5 and 6, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A wireless device configured for simultaneous voice and data communications, comprising:
    a voice and data transceiver comprising:
        data path circuitry, wherein the data path circuitry comprises a primary data receive chain, a data transmit chain, and a diversity data receive chain;
        voice path circuitry, wherein the voice path circuitry comprises a voice receive chain and a voice transmit chain;
        a first multiplexer, wherein the first multiplexer:
            sends a primary data receive signal to the primary data receive chain;
            sends a voice receive signal to the voice receive chain; and
            receives a data transmit signal from the data transmit chain;
        a second multiplexer, wherein the second multiplexer:
            sends a diversity data receive signal to the diversity data receive chain; and
            receives a voice transmit signal from the voice transmit chain;
    a first antenna coupled to the first multiplexer, wherein the data transmit signal is transmitted via the first antenna and the primary data receive signal and the voice receive signal are received via the first antenna; and
    a second antenna coupled to the second multiplexer, wherein the voice transmit signal is transmitted via the second antenna and the diversity data receive signal is received via the second antenna.

2. The wireless device of claim 1, wherein a configuration of the first multiplexer and the second multiplexer reduces third order intermodulation interference introduced in the voice and data transceiver.

3. The wireless device of claim 1, wherein the wireless device is a wireless communication device configured to operate using a Long Term Evolution standard.

4. The wireless device of claim 1, wherein the first multiplexer is a diplexer, and wherein the second multiplexer is a diplexer.

5. The wireless device of claim 1, wherein the voice and data transceiver further comprises:

a duplexer, wherein the duplexer is coupled between the second multiplexer and a data modem; and a resistor, wherein the resistor is coupled between the duplexer and ground.

6. The wireless device of claim 5, wherein the configuration of the duplexer and the resistor is such that the duplexer is used as a diversity receive signal filter.

7. The wireless device of claim 6, wherein the data transmit signal is terminated at the resistor such that it does not reflect back to the duplexer to generate third order intermodulation interference with the voice transmit signal.

8. The wireless device of claim 5, wherein the resistor is a 50 ohm resistor.

9. The wireless device of claim 5, wherein the first multiplexer is a diplexer, and wherein the second multiplexer is a diplexer.

10. The wireless device of claim 1, wherein the data path circuitry is part of a data modem, and wherein the voice path circuitry is part of a voice modem.

11. A wireless device configured for simultaneous voice and data communications, comprising:
a voice and data transceiver comprising:
data path circuitry, wherein the data path circuitry comprises a primary data receive chain, a data transmit chain, and a diversity data receive chain;
voice path circuitry, wherein the voice path circuitry comprises a voice receive chain and a voice transmit chain;
a first multiplexer, wherein the first multiplexer:
sends a diversity data receive signal to the diversity data receive chain;
sends a voice receive signal to the voice receive chain; and
receives a data transmit signal from the data transmit chain;
a second multiplexer, wherein the second multiplexer:
sends a primary data receive signal to the primary data receive chain; and
receives a voice transmit signal from the voice transmit chain;
a first antenna coupled to the first multiplexer, wherein the data transmit signal is transmitted via the first antenna and the diversity data receive signal and the voice receive signal are received via the first antenna; and
a second antenna coupled to the second multiplexer, wherein the voice transmit signal is transmitted via the second antenna and the primary data receive signal is received via the second antenna.

12. The wireless device of claim 11, wherein a configuration of the first multiplexer and the second multiplexer reduces third order intermodulation interference introduced in the voice and data transceiver.

13. The wireless device of claim 11, wherein the wireless device is a wireless communication device configured to operate using a Long Term Evolution standard.

14. The wireless device of claim 11, wherein the first multiplexer is a diplexer, and wherein the second multiplexer is a diplexer.

15. A method for simultaneous voice and data communication, comprising:
communicating a voice signal using:
a second multiplexer that receives a voice transmit signal from a voice transmit chain, wherein a second antenna is coupled to the second multiplexer, and wherein the voice transmit signal is transmitted via the second antenna; and
a first multiplexer that sends a voice receive signal to a voice receive chain, wherein a first antenna is coupled to the first multiplexer, and wherein the voice receive signal is received via the first antenna; and
communicating a data signal using:
the second multiplexer that sends a diversity data receive signal to a diversity data receive chain, wherein the diversity data receive signal is received via the second antenna; and
the first multiplexer that:
sends a primary data receive signal to the primary data receive chain, wherein the primary data receive signal is received via the first antenna; and
receives a data transmit signal from the data transmit chain, wherein the data transmit signal is transmitted via the first antenna.

16. The method of claim 15, wherein the first multiplexer is a diplexer, and wherein the second multiplexer is a diplexer.

17. The method of claim 15, wherein communicating the voice signal comprises transmitting the voice signal, and wherein communicating the data signal comprises transmitting the data signal.

18. The method of claim 17, wherein the voice signal and the data signal are transmitted simultaneously.

19. The method of claim 15, wherein communicating the voice signal comprises receiving the voice signal, and wherein communicating the data signal comprises receiving the data signal.

20. The method of claim 19, wherein the voice signal and the data signal are received simultaneously.

21. The method of claim 15, wherein the method is performed by a wireless communication device.

22. The method of claim 15, wherein communicating the voice signal comprises receiving the voice signal while simultaneously transmitting the voice signal.

23. The method of claim 15, wherein communicating the data signal comprises transmitting the data transmit signal while simultaneously receiving the primary data receive signal and the diversity data receive signal.

24. An apparatus for simultaneous voice and data communication, comprising:
means for communicating a voice signal using:
a second multiplexer that receives a voice transmit signal from a voice transmit chain, wherein a second antenna is coupled to the second multiplexer, and wherein the voice transmit signal is transmitted via the second antenna; and
a first multiplexer that sends a voice receive signal to a voice receive chain, wherein a first antenna is coupled to the first multiplexer, and wherein the voice receive signal is received via the first antenna; and
means for communicating a data signal using:
the second multiplexer that sends a diversity data receive signal to a diversity data receive chain, wherein the diversity data receive signal is received via the second antenna; and
the first multiplexer that:
sends a primary data receive signal to the primary data receive chain, wherein the primary data receive signal is received via the first antenna; and
receives a data transmit signal from the data transmit chain, wherein the data transmit signal is transmitted via the first antenna.

25. The apparatus of claim 24, wherein the first multiplexer is a diplexer, and wherein the second multiplexer is a diplexer.

26. The apparatus of claim 24, wherein communicating the voice signal comprises transmitting the voice signal, and wherein communicating the data signal comprises transmitting the data signal.

27. The apparatus of claim 26, wherein the voice signal and the data signal are transmitted simultaneously.

28. The apparatus of claim 24, wherein communicating the voice signal comprises receiving the voice signal, and wherein communicating the data signal comprises receiving the data signal.

29. The apparatus of claim 28, wherein the voice signal and the data signal are received simultaneously.

30. The apparatus of claim 24, wherein the apparatus is a wireless communication device.

31. The apparatus of claim 24, wherein communicating the voice signal comprises receiving the voice signal while simultaneously transmitting the voice signal.

32. The apparatus of claim 24, wherein communicating the data signal comprises transmitting the data transmit signal while simultaneously receiving the primary data receive signal and the diversity data receive signal.

33. A wireless device configured for simultaneous voice and data communications, comprising:
   a first antenna coupled to a first multiplexer, wherein the first multiplexer is coupled to a first duplexer, a second duplexer, and a third duplexer;
   a second antenna coupled to a second multiplexer, wherein the second multiplexer is coupled to a fourth duplexer, a fifth duplexer, and a sixth duplexer;
   a global positioning system (GPS) antenna;
   a data modem; and
   a voice and GPS modem;
   wherein: the first duplexer is configured to output a primary data receive signal to the data modem;
   the second duplexer is configured to receive a data optimized (DO) transmit signal from the data modem;
   the second duplexer is configured to output a voice receive signal via a switch to the voice and GPS modem;
   the third duplexer is configured to: receive a DO transmit signal from the data modem, and generate a personal communications system (PCS) receive signal,
   wherein the PCS receive signal is output to a switch that is configured to output a DO receive signal to the data modem or a 1x receive signal to the voice and GPS modem;
   the fourth duplexer is configured to output a long-term evolution (LTE) diversity data receive signal to the data modem,
   wherein the fourth duplexer is coupled to ground using a resistor;
   the fifth duplexer is configured to receive a 1x voice transmit signal from the voice and GPS modem; and the sixth duplexer is configured for personal communications service (PCS).

* * * * *